(12) United States Patent
Kim et al.

(10) Patent No.: US 10,874,135 B2
(45) Date of Patent: Dec. 29, 2020

(54) METHOD AND APPARATUS FOR MANUFACTURING FLAVOR CAPSULE OF TOBACCO

(71) Applicant: KT & G Corporation, Daejeon (KR)

(72) Inventors: Ick Joong Kim, Daejeon (KR); Jung Seop Hwang, Daejeon (KR); Chang Gook Lee, Daejeon (KR); Mi Jeong Bang, Daejeon (KR); Jae Gon Lee, Daejeon (KR); Han Joo Chung, Daejeon (KR)

(73) Assignee: KT & G Corporation, Daejeon (KR)

( * ) Notice: Subject to any disclaimer, the term of this patent is extended or adjusted under 35 U.S.C. 154(b) by 31 days.

(21) Appl. No.: 15/579,539

(22) PCT Filed: Apr. 4, 2016

(86) PCT No.: PCT/KR2016/003455
§ 371 (c)(1),
(2) Date: Dec. 4, 2017

(87) PCT Pub. No.: WO2017/022925
PCT Pub. Date: Feb. 9, 2017

(65) Prior Publication Data
US 2018/0317541 A1    Nov. 8, 2018

(30) Foreign Application Priority Data

Aug. 6, 2015  (KR) .................. 10-2015-0111167
Aug. 6, 2015  (KR) .................. 10-2015-0111175

(51) Int. Cl.
*A24D 3/02*   (2006.01)
*B01J 13/02*  (2006.01)
(Continued)

(52) U.S. Cl.
CPC ............ *A24D 3/02* (2013.01); *A24D 3/06* (2013.01); *A24D 3/061* (2013.01); *B01J 13/02* (2013.01); *A24D 3/0216* (2013.01); *A24D 3/04* (2013.01)

(58) Field of Classification Search
CPC ............................ A24D 3/02; A24D 3/06
(Continued)

(56) References Cited

U.S. PATENT DOCUMENTS 3,423,489 A * 1/1969 Arens .................. B29C 70/58
                                                        264/4
5,286,181 A * 2/1994 Schwager ........... A23G 3/0247
                                                         425/8
(Continued)

FOREIGN PATENT DOCUMENTS

CN    101925403 A    12/2010
CN    102843918 A    12/2012
(Continued)

OTHER PUBLICATIONS

Korean Office Action for Korean Application No. 10-2015-0111175, dated Feb. 5, 2016, 24 pages with English translation.
(Continued)

*Primary Examiner* — Eric Yaary
*Assistant Examiner* — Russell E Sparks
(74) *Attorney, Agent, or Firm* — TraskBritt

(57) ABSTRACT

An apparatus for manufacturing a flavor capsule of tobacco according to an embodiment of the present disclosure may comprise: a membrane tank for storing a membrane; a flavored liquid tank for storing a flavored liquid; and a nozzle to which the membrane is supplied from the membrane tank, to which the flavored liquid is supplied from the flavored liquid tank, and through which the flavored liquid is discharged while being enveloped in the membrane, so as
(Continued)

to form the initial shape of a flavor capsule, wherein the membrane tank is equipped with a temperature adjustment unit for lowering the temperature of the membrane tank over time in order to preserve the viscosity of the membrane.

4 Claims, 7 Drawing Sheets

(51) Int. Cl.
*A24D 3/06* (2006.01)
*A24D 3/04* (2006.01)

(58) Field of Classification Search
USPC .......................................................... 131/337
See application file for complete search history.

(56) References Cited

U.S. PATENT DOCUMENTS

| | | | | |
|---|---|---|---|---|
| 5,595,757 | A * | 1/1997 | Kiefer | B01J 13/04 |
| | | | | 424/451 |
| 5,962,539 | A * | 10/1999 | Perrut | B01J 13/0091 |
| | | | | 521/146 |
| 6,174,466 | B1 | 1/2001 | Kiefer et al. | |
| 6,596,181 | B2 * | 7/2003 | Dolecek | A61M 1/3693 |
| | | | | 210/512.1 |
| 10,015,984 | B2 * | 7/2018 | Kondo | A24D 3/061 |
| 2009/0050163 | A1 | 2/2009 | Hartmann et al. | |
| 2010/0294290 | A1 | 11/2010 | Zhang | |
| 2011/0008293 | A1 * | 1/2011 | Bhandari | A01N 25/28 |
| | | | | 424/93.6 |
| 2011/0271968 | A1 | 11/2011 | Carpenter et al. | |
| 2016/0021927 | A1 | 1/2016 | Kondo | |

FOREIGN PATENT DOCUMENTS

| | | | | |
|---|---|---|---|---|
| CN | 104812256 A | 7/2015 | | |
| EP | 0513603 A1 * | 11/1992 | | A61J 3/07 |
| EP | 2789249 A1 | 10/2014 | | |
| JP | 59-046540 A | 3/1984 | | |
| JP | 04-338230 A | 11/1992 | | |
| JP | 2008-546400 | 12/2008 | | |
| JP | 2011-512122 | 4/2011 | | |
| JP | 2012-001553 A | 1/2012 | | |
| JP | 5581446 B1 | 8/2014 | | |
| KR | 100230059 B1 | 11/1999 | | |
| KR | 20080022127 A | 3/2008 | | |
| KR | 20110007081 A | 1/2011 | | |
| WO | 2010/146845 A1 | 12/2010 | | |
| WO | WO-2013020835 A2 * | 2/2013 | | B01J 13/046 |
| WO | 2014/170947 A1 | 10/2014 | | |
| WO | WO-2014170947 A1 * | 10/2014 | | A24D 3/061 |

OTHER PUBLICATIONS

Korean Office Action for Korean Application No. 10-2015-0111167, dated Feb. 5, 2016, 19 pages with English Translation.
Korean Office Action for Korean Application No. 10-2015-0111175, dated Aug. 25, 2016, 5 pages with English Translation.
Japanese Search Report for Japanese Application No. 2017-562642, dated Oct. 29, 2018, 29 pages with English Translation.
Japanese Notice of Reasons for Refusal for Japanese Application No. 2017-562642, dated Dec. 6, 2018, 9 pages with English translation.
International Written Opinion for International Application No. PCT/KR2016/003455, dated Jul. 8, 2016, 29 pages with English Translation.
International Search Report for International Application No. PCT/KR2016/003455, dated Jul. 8, 2016, 7 pages with English Translation.
International Search Report for International Application No. PCT/KR2016/003455 dated Aug. 7, 2016, 3 pages.
International Written Opinion for International Application No. PCT/KR2016/003455 dated Aug. 7, 2016, 11 pages.
Japanese Notice of Reasons for Refusal for Japanese Application No. 2019-044260, dated May 19, 2020, 8 pages with English translation.
Chinese Second Office Action for Chinese Application No. 201680028023.0, dated Jun. 3, 2020, 7 pages with English Translation.
Chinese Supplementary Search Report for Chinese Application No. 201680028023.0, dated May 28, 2020, 1 page.

* cited by examiner

US 10,874,135 B2

METHOD AND APPARATUS FOR MANUFACTURING FLAVOR CAPSULE OF TOBACCO

CROSS-REFERENCE TO RELATED APPLICATIONS

This application is a national phase entry under 35 U.S.C. § 371 of International Patent Application PCT/KR2016/003455, filed Apr. 4, 2016, designating the United States of America and published as International Patent Publication WO 2017/022925 A1 on Feb. 9, 2017, which claims the benefit under Article 8 of the Patent Cooperation Treaty to Korean Patent Application Serial Nos. 10-2015-0111167 and 10-2015-0111175, both filed Aug. 6, 2015.

TECHNICAL FIELD

Example embodiments relate to a method and apparatus for manufacturing a flavor capsule of a cigarette and, more particularly, to a method and apparatus for manufacturing a flavor capsule of a cigarette that may maintain an appropriate temperature of a membrane forming the flavor capsule and maintain a viscosity of the membrane accordingly, thereby improving reliability of a finished product of the flavor capsule.

BACKGROUND

In general, to manufacture cigarettes, various types of leaf tobacco are blended and processed to provide desired flavors and tastes to the cigarettes. The processed leaf tobacco is cut and folded to produce a cut tobacco leaf, and the cut tobacco leaf is then rolled with a cigarette paper to produce a filter-free cigarette. As necessary, a filter may be attached to such a filter-free cigarette.

The cigarette paper may be made with, for example, flax, wood pulp, and the like, and need to be produced to maintain a burning quality and a taste of a cigarette while the cigarette is being smoked. The cigarette filter may include activated carbon, flavoring substances, and others. The cigarette filter may be embodied as a mono-filter or a multi-filter, and wrapped with a cigarette filter wrapping paper. The cut tobacco leaf and the cigarette filter are connected through a tipping paper that includes fine holes.

The cigarette filter may include a flavor capsule containing therein flavor or incense. Thus, a user may taste and/or smell the flavor, for example, a scent of menthol, when the flavor capsule is torn or crushed during smoking. The flavor capsule includes a flavored liquid emitting such a flavor or incense, and a membrane wrapping the flavored liquid. Through the membrane wrapping the flavored liquid, a form of the flavor capsule may be maintained, and the user may taste and/or smell a scent of the flavored liquid when the membrane of the flavor capsule is torn and the flavored liquid escapes during smoking. Thus, when manufacturing the flavor capsule, maintaining a viscosity or a temperature of the membrane may be important to allow the membrane to be bound to the flavored liquid when the membrane wraps the flavored liquid and also allow the membrane to be torn well when an external force is applied by the user. In addition, the flavor capsule may need to have an optimal crush strength such that the membrane is bound to the flavored liquid to wrap the flavored liquid and torn well when the external force is applied by the user.

Therefore, there is a desire for a development of a method and apparatus for maintaining a viscosity and a temperature of a membrane of a flavor capsule, and also for a development of a method and apparatus for manufacturing a flavor capsule having an optimal crush strength.

BRIEF SUMMARY

Technical Goals

Example embodiments provide a method and apparatus for manufacturing a flavor capsule of a cigarette that may maintain a viscosity of a membrane of the flavor capsule by maintaining a temperature of the membrane in a membrane tank or a membrane supply line, and thus allow the membrane to have a desirable viscosity when the membrane wraps a flavored liquid in a nozzle, thereby manufacturing a firm fragrance capsule.

Example embodiments also provide a method and apparatus for manufacturing a flavor capsule of a cigarette that may improve efficiency in a process of manufacturing the flavor capsule by manufacturing a membrane and manufacturing the flavor capsule through a series of processes, and may manufacture the membrane to be desirably bound to a flavored liquid of the flavor capsule, thereby achieving stability by preventing the flavor capsule from being randomly torn or crushed and providing a user with reliability by having the flavor capsule be torn only when an external force is applied by the user.

Example embodiments also provide a method and apparatus for manufacturing a flavor capsule of a cigarette that may manufacture a membrane of the flavor capsule based on a set ratio and composition during a series of processes of manufacturing the flavor capsule, adjust a thickness of the membrane, and perform a hardening process twice, thereby manufacturing the flavor capsule having an optimal crush strength.

Technical Solutions

According to an example embodiment, there is provided an apparatus for manufacturing a flavor capsule of a cigarette, the apparatus including a membrane tank configured to store a membrane, a flavored liquid tank configured to store a flavored liquid, and a nozzle configured to receive the membrane from the membrane tank and the flavored liquid from the flavored liquid tank, and discharge the membrane and the flavored liquid such that the membrane wraps the flavored liquid to form an initial form of the flavor capsule. The membrane tank may include a temperature adjuster configured to decrease a temperature of the membrane tank based on time to maintain a viscosity of the membrane. Through such a configuration described in the foregoing, an appropriate temperature of the membrane may be maintained and an appropriate viscosity of the membrane may be maintained, and thus the membrane may have the appropriate viscosity when the membrane wraps the flavored liquid at the nozzle, thereby manufacturing a firm flavor capsule.

An initial temperature of the membrane tank to be filled with the membrane may be 65° C. to 70° C., and the temperature adjuster may decrease the temperature of the membrane tank by 1° C. to 2° C. per hour to maintain a viscosity of the membrane in the membrane tank.

In response to the temperature of the membrane tank reaching a preset temperature while the temperature adjuster is decreasing the temperature of the membrane tank, the temperature adjuster may maintain the temperature of the membrane tank at not less than the preset temperature.

The preset temperature may be 60° C.

The membrane tank and the nozzle may be connected through a membrane supply line, and the membrane supply line may include a temperature maintainer configured to maintain a temperature of the membrane supply line to be the temperature of the membrane tank.

In response to the temperature of the membrane supply line reaching a preset temperature while the temperature maintainer is decreasing the temperature of the membrane supply line, the temperature maintainer may maintain the temperature of the membrane supply line at not less than the preset temperature. The preset temperature may be 60° C.

The viscosity of the membrane to be maintained by the temperature adjuster may be 400 to 700 centipoise (cps).

The viscosity of the membrane may be corrected by controlling a temperature of the membrane through the temperature adjuster or the temperature maintainer.

Such a temperature control by the temperature adjuster based on an initial viscosity of the membrane in the membrane tank may be programmed and automatically performed.

According to another example embodiment, there is provided an apparatus for manufacturing a flavor capsule of a cigarette, the apparatus including a capsule manufacturer including a membrane tank configured to store a membrane, a flavored liquid tank configured to store a flavored liquid, and a nozzle connected to the membrane tank and the flavored liquid tank through respective supply lines, and configured to form an initial form of the flavor capsule by discharging the membrane transferred from the membrane tank and the flavored liquid transferred from the flavored liquid tank such that the membrane wraps the flavored liquid, and a first hardener configured to first harden the flavor capsule manufactured by the capsule manufacturer. A thickness of the membrane of the flavor capsule manufactured by the capsule manufacturer may be 0.5 to 0.8 millimeter (mm).

By setting the thickness of the membrane of the flavor capsule manufactured by the capsule manufacturer to be 0.5 to 0.8 mm, a crush strength of the flavor capsule may be adjusted to 0.8 to 2.0 kilograms-force (kgf).

The apparatus may further include a second hardener configured to secondarily harden the flavor capsule dried by a dryer after being hardened by the first hardener. The second hardener may harden the flavor capsule using an ethanol (EtOH) solution prepared by mixing distilled water and EtOH at a preset ratio.

The distilled water may be an aqueous 0.1% to 5.0% calcium chloride solution, and the preset ratio of the distilled water to the EtOH may be 4:6 to 7:3.

The first hardener may harden the flavor capsule manufactured by the capsule manufacturer by immersing the flavor capsule in a prepared 70% to 100% EtOH solution for 3 to 5 minutes.

The apparatus may further include a membrane manufacturer configured to manufacture the membrane and supply the manufactured membrane to the capsule manufacturer. The membrane manufacturer may manufacture the membrane with agar, pectin, and sodium alginate, which constitute 45% to 55%, 35% to 45%, and 5% to 15%, respectively, of the membrane, excluding water and plasticizer.

An optimal viscosity of the membrane manufactured by the membrane manufacturer may be 400 to 700 cps, and the membrane manufacturer may include a gelation temperature maintainer to maintain a gelation temperature of the membrane. The gelation temperature of the membrane by the gelation temperature maintainer may be 48° C. to 50° C.

According to still another example embodiment, there is provided a method of manufacturing a flavor capsule of a cigarette, the method including manufacturing a membrane of the flavor capsule by a membrane manufacturer configured to manufacture a membrane, adjusting a temperature of the membrane to maintain a viscosity of the manufactured membrane, and manufacturing, by an apparatus for manufacturing a flavor capsule of a cigarette, the flavor capsule with the manufactured membrane and a flavored liquid to be contained in the membrane. A temperature of a membrane tank in which the manufactured membrane is to be stored may decrease based on time to maintain a viscosity of the membrane in the membrane tank.

The adjusting of the temperature may include adjusting the temperature of the membrane tank by a temperature adjuster, and maintaining, by a temperature maintainer, a temperature of a membrane supply line configured to transfer the membrane from the membrane tank to a nozzle of the apparatus to be the temperature of the membrane tank.

An initial temperature of the membrane tank to be filled with the manufactured membrane may be 65° C. to 70° C., and the temperature adjuster may decrease the temperature of the membrane tank by 0.5° C. to 2° C. per hour to maintain the viscosity of the membrane in the membrane tank.

In the adjusting of the temperature of the membrane tank, in response to the temperature of the membrane tank reaching a preset temperature while the temperature adjuster is decreasing the temperature of the membrane tank, the temperature adjuster may maintain the temperature of the membrane tank at not less than the preset temperature.

In the maintaining of the temperature of the membrane supply line, in response to the temperature of the membrane supply line reaching a preset temperature while the temperature maintainer is decreasing the temperature of the membrane supply line, the temperature maintainer may maintain the temperature of the membrane supply line at not less than the preset temperature.

According to yet another example embodiment, there is provided a method of manufacturing a flavor capsule of a cigarette, the method including manufacturing, by an apparatus for manufacturing a flavor capsule of a cigarette, the flavor capsule with a membrane and a flavored liquid to be contained in the membrane, drying the flavor capsule by a dryer, and hardening the flavor capsule. A thickness of the membrane of the flavor capsule to be manufactured in the manufacturing may be 0.5 to 0.8 mm such that a crush strength of the flavor capsule is in a preset range.

By setting the thickness of the membrane of the flavor capsule to be manufactured in the manufacturing to be 0.5 to 0.8 mm, the crush strength of the flavor capsule may be adjusted to 0.8 to 2.0 kgf.

Distilled water used in the hardening of the flavor capsule may be an aqueous 0.1% to 5.0% calcium chloride solution, and the distilled water and EtOH may be mixed at a preset ratio of 4:6 to 7:3.

The method may further include manufacturing the membrane before the manufacturing of the flavor capsule.

According to yet another example embodiment, there is provided a method of manufacturing a flavor capsule of a cigarette, the method including manufacturing, by an apparatus for manufacturing a flavor capsule of a cigarette, the flavor capsule with a membrane and a flavored liquid to be contained in the membrane, performing first hardening on the flavor capsule, drying the flavor capsule by a dryer, and performing second hardening on the flavor capsule to additionally harden the flavor capsule. In the second hardening, the flavor capsule may be additionally hardened with an EtOH solution prepared by mixing distilled water and EtOH at a preset ratio.

The distilled water may be an aqueous 0.1% to 5.0% calcium chloride solution, and the preset ratio of the distilled water to the EtOH may be 4:6 to 7:3.

In the first hardening, the flavor capsule may be hardened by stirring the manufactured flavor capsule with a prepared 70% to 100% EtOH solution, and immersing the flavor capsule in the prepared EtOH solution for 3 to 5 minutes.

Advantageous Effects

According to example embodiments described herein, a firm flavor capsule may be manufactured by maintaining a temperature of a membrane in a membrane tank or a membrane supply line and maintaining a viscosity of the membrane, thereby allowing the membrane to have a desirable viscosity when the membrane wraps a flavored liquid at a nozzle.

According to example embodiments described herein, a membrane and a flavor capsule may be manufactured in a series of processes, and thus efficiency in a method of manufacturing the flavor capsule may be improved. In addition, the flavor capsule may be manufactured to allow the membrane to be desirably bound to a flavored liquid, thereby achieving stability by preventing the flavor capsule from being randomly torn or crushed, and also providing a user with reliability by having the flavor capsule be torn or crushed only when an external force is applied by the user.

According to example embodiments described herein, a flavor capsule having an optimal crush strength may be manufactured by manufacturing a membrane of the flavor capsule based on a set ratio and composition during a series of processes of manufacturing the flavor capsule, adjusting a thickness of the membrane, and performing a hardening process twice.

DETAILED DESCRIPTION

Figure 1:
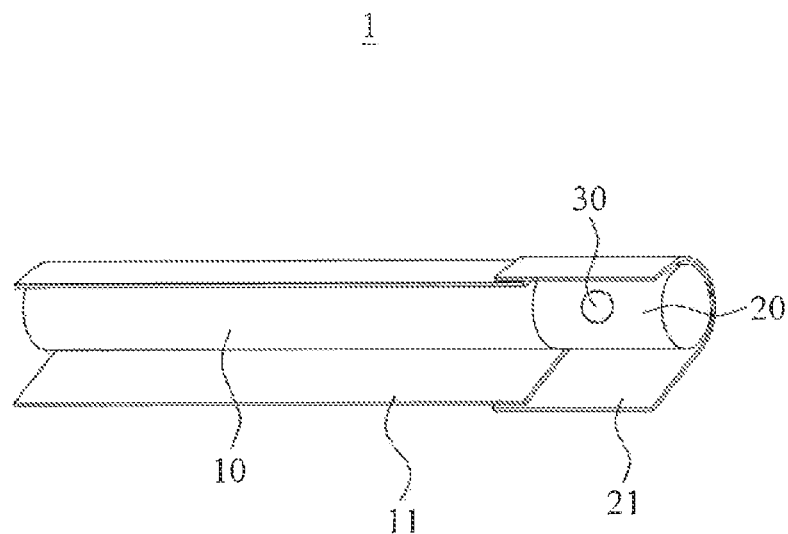
FIG. 1 is a perspective view illustrating an example of a smokeless cigarette according to an example embodiment.

Hereinafter, example embodiments will be described in detail with reference to the accompanying drawings, wherein like reference numerals refer to the like elements throughout. The following description relates to one aspect among various aspects of the present disclosure, and it constitutes a portion of the detailed description of the present disclosure.

In the description of the example embodiments, detailed description of well-known related structures or functions will be omitted when it is deemed that such description will cause ambiguous interpretation of the present disclosure.

FIG. 1 is a perspective view illustrating an example of a cigarette according to an example embodiment.

Referring to FIG. 1, a cigarette 1 of a general type includes a cut tobacco leaf portion 10, a filter portion 20 connected to a rear end of the cut tobacco leaf portion 10, a cigarette paper 11 wrapping the cut tobacco leaf portion 10, and a filter wrapping paper 21 wrapping the rear end of the cut tobacco leaf portion 10 and the filter portion 20. In addition, a flavor capsule 30 is accommodated or contained in the filter portion 20.

Through such a configuration described in the foregoing, a user may taste and/or smell a scent of a flavored liquid contained in the flavor capsule 30 by having the flavor capsule 30 be torn or crushed when the user smokes the cigarette 1.

For example, in a case of the cigarette 1 in which the flavor capsule 30 including a flavored liquid of menthol is embedded in the filter portion 20, a user may smoke the cigarette 1 while tasting and/or smelling a scent of menthol by having the flavor capsule 30 be torn or crushed when the user uses the cigarette 1.

Although to be described with the accompanying drawings, a flavor capsule 101 includes a flavored liquid 121 and a membrane 111 wrapping the flavored liquid 121. Here, the term "tear" or "crush" the flavor capsule 101 may indicate that the membrane 111 is torn or crushed and then the flavored liquid 121 contained therein starts escaping, and through which a user may taste and/or smell a scent of the flavored liquid 121.

Thus, to maintain a binding force of the membrane 111 to the flavored liquid 121 when the membrane 111 wraps the flavored liquid 121, and also to have the flavor capsule 101 be torn or crushed well when an external force is applied by a user, maintaining a viscosity or a temperature of the membrane 111 may be important when manufacturing the flavor capsule 101. Hereinafter, a configuration of an apparatus for manufacturing a flavor capsule of a cigarette, hereinafter simply referred to as a flavor capsule manufacturing apparatus, and a method of manufacturing a flavor capsule of a cigarette, hereinafter simply referred to as a flavor capsule manufacturing method, will be described in detail.

Figure 2:
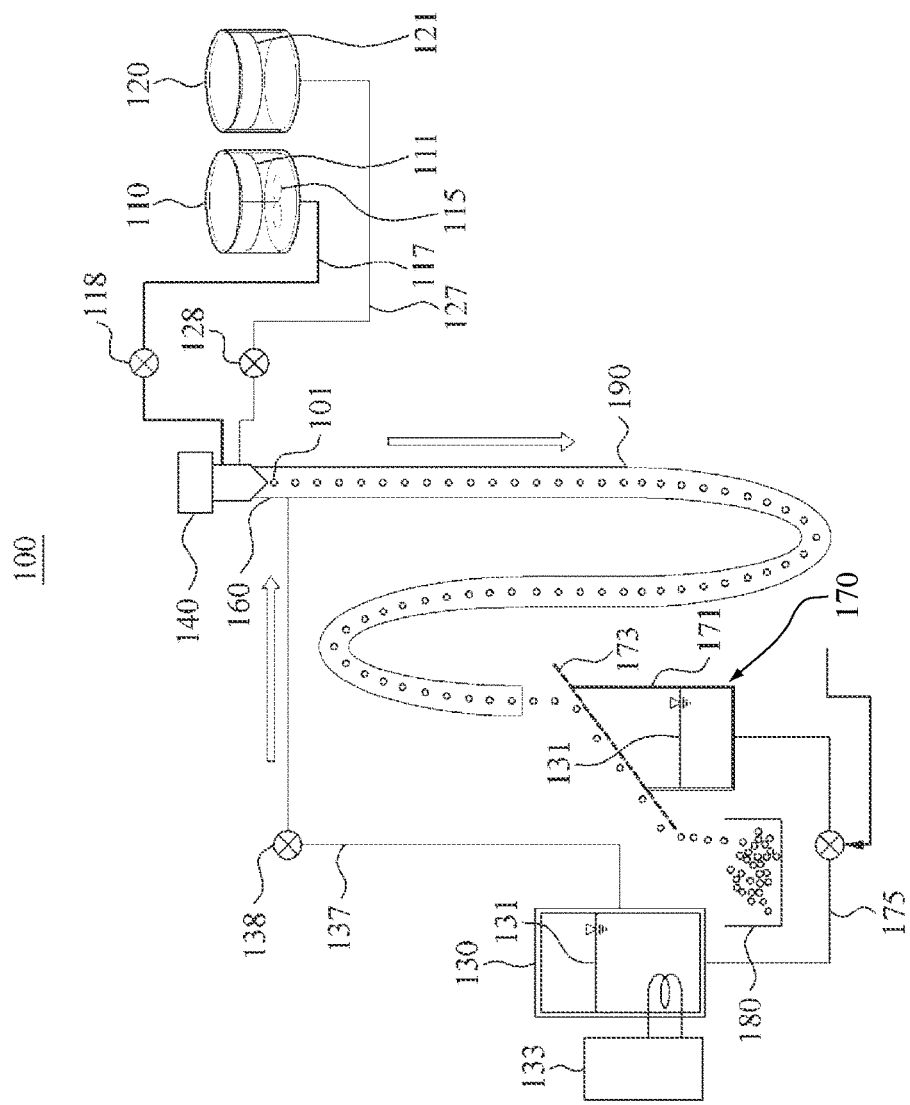
FIG. 2 is a diagram illustrating an example of an apparatus for manufacturing a flavor capsule of a cigarette according to an example embodiment.
Figure 3:
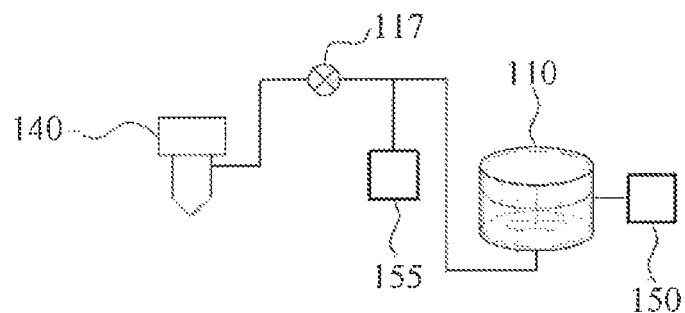
FIG. 3 is a diagram illustrating an example of a configuration used to maintain a viscosity of a membrane when the membrane is transferred from a membrane tank to a nozzle illustrated in FIG. 2.

FIG. 2 is a diagram illustrating an example of a configuration of a flavor capsule manufacturing apparatus according to an example embodiment. FIG. 3 is a diagram illustrating an example of a configuration used to maintain a viscosity of a membrane when the membrane is transferred from a membrane tank to a nozzle illustrated in FIG. 2.

Referring to FIG. 2, a flavor capsule manufacturing apparatus 100 according to an example embodiment includes a membrane tank 110 configured to store a membrane 111, a flavored liquid tank 120 configured to store a flavored liquid 121, a coolant tank or a medium-chain triglyceride (MCT) tank 130 configured to store a coolant, for example, an MCT solution 131 as illustrated, a nozzle 140 connected to the membrane tank 110 and the flavored liquid tank 120 through a membrane supply line 117 and a flavored liquid supply line 127, respectively, and configured to form the flavor capsule 101, or an initial form of the flavor capsule 101, by discharging the membrane 111 transferred from the membrane tank 110 and the flavored liquid 121 transferred from the flavored liquid tank 120 such that the membrane 111 wraps the flavored liquid 121, a flavor capsule transfer line 190 connected to the nozzle 140 to transfer the flavor capsule 101 discharged from the nozzle 140 by each unit, and more particularly, connected to an MCT supply line 137 configured to supply the MCT solution 131 to allow the flavor capsule 101 to be transferred by the MCT solution 131 supplied by the MCT supply line 137, and a capsule storage 180 configured to store the flavor capsule 101 transferred, while being cooled, through the flavor capsule transfer line 190.

The membrane tank 110 stores the membrane 111 manufactured by a membrane manufacturer (not shown), and includes a rotating paddle 115 therein to maintain a dissolved and uniform state of the membrane 111. The membrane tank 110 is connected to the nozzle 140 through the membrane supply line 117, and thus the membrane 111 in the membrane tank 110 is supplied to the nozzle 140. In the membrane supply line 117, a gear pump 118 is provided to supply the membrane 111, and opens the membrane tank 110 to smoothly transfer the membrane 111.

As illustrated in FIG. 2, the flavored liquid tank 120 stores the flavored liquid 121. The flavored liquid tank 120 is connected to the nozzle 140 through the flavored liquid supply line 127 that includes a gear pump 128 to supply the flavored liquid 121, and thus the flavored liquid 121 may be smoothly transferred from the flavored liquid tank 120 to the nozzle 140.

The nozzle 140 forms the initial form of the flavor capsule 101, and discharges the membrane 111 flowing in the nozzle 140 to wrap the flavored liquid 121 to form the initial form of the flavor capsule 101.

As illustrated in FIGS. 2 and 3, the nozzle 140 is provided in a dual discharge structure, and thus the nozzle 140 may discharge the initial form of the flavor capsule 101 by allowing the flavored liquid 121 and the membrane 111 that flow in the nozzle 140 to interact with each other.

The initial form of the flavor capsule 101 that is discharged by the nozzle 140 is transferred along the flavor capsule transfer line 190. Here, the MCT solution 131 flows along the flavor capsule transfer line 190, and thus the flavor capsule 101 is transferred toward the capsule storage 180 while being cooled along a flow of the MCT solution 131. That is, the MCT solution 131 forms such a flow and the flavor capsule 101 is transferred along the formed flow.

As described above, the MCT solution 131 is supplied by the MCT tank 130. The MCT tank 130 and an upper end portion of the flavor capsule transfer line 190, which is adjacent to the nozzle 140, are connected through the MCT supply line 137 such that the MCT solution 131 is supplied via pump 138 to an inlet portion 160 of the flavor capsule transfer line 190, which is a portion 160 to which the flavor capsule 101 is discharged from the nozzle 140. Through such a structure, the MCT solution 131, or the coolant, may directly affect the flavor capsule 101 discharged from the nozzle 140, and thus the flavor capsule 101 may be cooled. Accordingly, surface bonding of the membrane 111 to the flavored liquid 121 may be more firmly performed.

In addition, the flavor capsule 101 and the MCT solution 131 that are transferred through the flavor capsule transfer line 190 are separated by a capsule separator 170, instead of being transferred immediately to the capsule storage 180, and thus the flavor capsule 101 is then transferred to the capsule storage 180 and the MCT solution 131 is transferred back to the MCT tank 130.

As illustrated in FIG. 2, the capsule separator 170 includes an MCT storage tank 171 in which the MCT solution 131 is temporarily stored, and a separation plate 173 disposed at a slant in an upper end portion of the MCT storage tank 171 and configured to transfer the flavor capsule 101 to the capsule storage 180 and allow the MCT solution 131 to permeate the MCT storage tank 171.

The separation plate 173 is tilted downwards in a direction of the capsule storage 180 such that the flavor capsule 101 transferred through the flavor capsule transfer line 190 is dropped into the capsule storage 180. Here, the MCT solution 131 transferring the flavor capsule 101 may also be dropped together. However, according to an example embodiment, due to the separation plate 173 being provided so as to have permeability, the MCT solution 131 may be dropped into the MCT storage tank 171.

Referring to FIG. 2, the MCT storage tank 171 is connected to the MCT tank 130 through a connection line 175, and thus the MCT solution 131 that is temporarily stored in the MCT storage tank 171 is transferred again to the MCT tank 130. Thus, the MCT solution 131 may be reusable through such a circulation structure that may be effective in terms of cost reduction. The MCT tank 130 includes a cooler 133 to cool the MCT solution 131 stored in the MCT tank 130, and thus the cooled MCT solution 131 may be supplied to the flavor capsule transfer line 190.

As described above, a viscosity of the membrane 111 may be important when the membrane 111 wraps the flavored liquid 121. That is, a viscosity of the membrane 111 to be supplied to the nozzle 140 may be important, and such a viscosity may be determined by a temperature of the membrane 111. Thus, adjusting the temperature of the membrane 111 may also be important. For example, in a case in which a temperature of the membrane 111 decreases below a certain temperature, the membrane 111 may be lumped or agglomerated, and not to be properly bound to the flavored liquid 121.

Therefore, the flavor capsule manufacturing apparatus 100 further includes a component to maintain a viscosity of the membrane 111. Referring to FIG. 3, a temperature adjuster 150 is provided to the membrane tank 110 to decrease a temperature of the membrane tank 110 based on time to maintain a viscosity of the membrane 111. In addition, a temperature maintainer 155 is provided in the membrane supply line 117 to maintain a temperature of the membrane supply line 117 to be a temperature of the membrane tank 110 in order to maintain a viscosity of the membrane 111 to be supplied to the nozzle 140 through the membrane supply line 117.

Through such a configuration, the viscosity of the membrane 111 may be maintained to be an optimal viscosity that is needed for forming the flavor capsule 101, for example, 400 to 700 centipoise (cps).

In detail, in a case of an absence of such a configuration to maintain a temperature of the membrane 111 after the membrane 111 is manufactured, an initial viscosity, for example, 600 cps, of the membrane 111 after the membrane 111 is manufactured may decrease to 250 cps as time elapses, and thus the membrane 111 may be lumped or agglomerated. According to an example embodiment, it is possible to maintain a viscosity of the membrane 111 to be within a desirable range using the temperature adjuster 150 and the temperature maintainer 155.

As illustrated in FIG. 3, the temperature adjuster 150 is provided to the membrane tank 110 to adjust a temperature of the membrane tank 110. An initial temperature of the membrane tank 110 to be filled with the membrane 111 manufactured by the membrane manufacturer may be 65° C. to 70° C., and the temperature adjuster 150 decreases the temperature of the membrane tank 110 by 0.5° C. to 2° C. per hour to maintain a viscosity of the membrane 111 in the membrane tank 110. Thus, the viscosity of the membrane 111 may be maintained, thereby preventing the membrane 111 from being lumped or agglomerated.

Here, the temperature adjuster 150 also maintains a temperature of the membrane tank 110 such that the temperature of the membrane tank 110 is not to decrease to be less than a set temperature, for example, 60° C. However, the set temperature of the membrane tank 110 is not limited to the example described in the foregoing.

In addition, as illustrated in FIG. 3, the temperature maintainer 155 is provided in the membrane supply line 117. The temperature maintainer 155 is provided in various forms and a coil having a heat generating function, for example, may be applicable thereto.

The temperature maintainer 155 maintains a temperature of the membrane supply line 117 to be a temperature of the membrane tank 110. As described above, the temperature of the membrane tank 110 may be decreased by 1° C. per hour, for example, from 65° C. to 60° C., by the temperature adjuster 150. The temperature of the membrane supply line 117 may also be decreased by 1° C. per hour from 65° C. to 60° C., accordingly.

Similar to the temperature adjuster 150 described above, the temperature maintainer 155 also maintains a temperature of the membrane supply line 117 such that the temperature of the membrane supply line 117 is not to decrease to be less than a set temperature when the temperature of the membrane supply line 117 reaches the set temperature while the temperature maintainer 155 is decreasing the temperature of the membrane supply line 117. Here, the set temperature may be 60° C. corresponding to the set temperature of the membrane tank 110, but not limited thereto.

The temperature adjuster 150 and the temperature maintainer 155 may be automatically controlled based on an initial viscosity of the membrane 111 supplied from the membrane manufacturer to the membrane tank 110. That is, a temperature adjustment program of the temperature adjuster 150 and the temperature maintainer 155 may be set based on the initial viscosity, and thus a temperature of the membrane 111 may be automatically controlled based on a viscosity of the membrane 111.

A flavor capsule manufacturing method to be performed by the flavor capsule manufacturing apparatus 100 that is configured as described above will be described in detail hereinafter.

Figure 4:
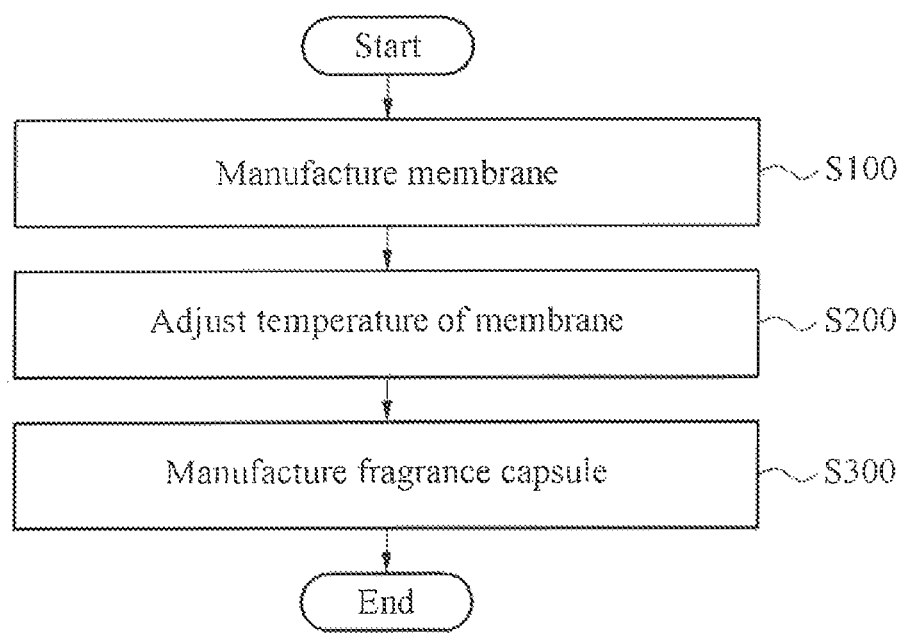
FIG. 4 is a flowchart illustrating an example of a method of manufacturing a flavor capsule of a cigarette according to an example embodiment.

Referring to FIG. 4, a flavor capsule manufacturing method according to an example embodiment includes a membrane manufacturing step S100 of manufacturing the membrane 111 by the membrane manufacturer configured to manufacture a membrane, a membrane temperature adjusting step S200 of adjusting a temperature of the membrane 111 to maintain a viscosity of the manufactured membrane 111, and a capsule manufacturing step S300 of manufacturing the flavor capsule 101 with the membrane 111 and the flavored liquid 121 to be contained in the membrane 111 by the flavor capsule manufacturing apparatus 100.

The membrane manufacturing step S100 is performed to manufacture a membrane material that wraps the flavored liquid 121, and includes forming the membrane 111 by weighing an amount of each of substances included in the membrane 111 and dissolving the substances included in the membrane 111, and measuring a viscosity of the formed membrane 111.

The substances included in the membrane 111 include agar, pectin, sodium alginate, and glycerin as a plasticizer.

Here, a viscosity of the membrane 111 may need to be measured to verify whether the viscosity of the membrane 111 is in a set range in order to prevent a quality issue of a finished product, which may be caused when the viscosity of the membrane 111 is out of the range. As described, an optimal viscosity of the membrane 111 is 400 to 700 cps.

The membrane temperature adjusting step S200 is performed to maintain a temperature of the membrane tank 110 and a temperature of the membrane supply line 117 in order to maintain a viscosity of the membrane 111 that is manufactured by the membrane manufacturer and then transferred to the membrane tank 110.

The membrane temperature adjusting step S200 includes a tank temperature adjusting step of adjusting a temperature of the membrane tank 110 by the temperature adjuster 150, and a line temperature maintaining step of maintaining a temperature of the membrane supply line 117 to be a temperature of the membrane tank 110 by the temperature maintainer 155.

As described, in the tank temperature adjusting step, the temperature adjuster 150 decreases a temperature of the membrane tank 110 by 1° C. per hour from 65° C. to 60° C., but not to be less than a set temperature, for example, 60° C.

In addition, in the line temperature adjusting step, the temperature maintainer 155 controls a temperature of the membrane supply line 117 to correspond to a temperature of the membrane tank 110 by decreasing the temperature of the membrane supply line 117 by 1° C. per hour from 65° C. to 60° C.

Figure 5:
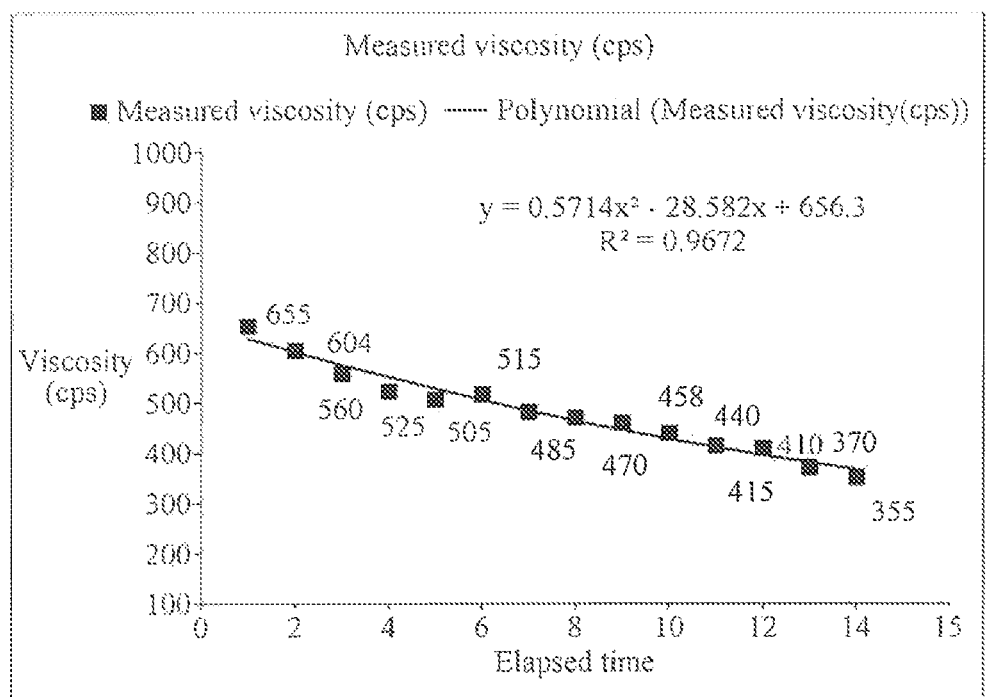
FIG. 5 is a graph illustrating a change in a viscosity of a membrane measured based on time elapsed when a temperature of the membrane is adjusted according to an example embodiment.

The following is a table illustrating a change in a viscosity of the membrane 111 measured with the lapse of time, and FIG. 5 is a graph illustrating the change. Experimental conditions are set as follows: a temperature of the membrane tank 110 is set to be 65° C., the rotating paddle 115 rotates at 20 revolutions per minutes (RPM), and a volume of the membrane tank 110 at a time of measuring the viscosity is 1.2 liters (L) and 1L of membrane 111 is prepared to measure the viscosity thereof. In addition, a viscosity measuring environment includes a DV2T viscometer (available from Ametek Brookfield of Middleboro, Mass.) with an LV-2 (62) spindle at 30 RPM.

| Time elapsed | Measured viscosity (cps) | Viscosity change (cps) |
|---|---|---|
| Immediately after manufacturing | 655 | |
| After defoaming | 604 | −51 |

| Time elapsed | Measured viscosity (cps) | Viscosity change (cps) |
| --- | --- | --- |
| 1 | 560 | −44 |
| 2 | 525 | −35 |
| 3 | 505 | −20 |
| 4 | 515 | 10 |
| 5 | 485 | −30 |
| 6 | 470 | −15 |
| 7 | 458 | −12 |
| 8 | 440 | −18 |
| 9 | 415 | −25 |
| 10 | 410 | −5 |
| 11 | 370 | −40 |
| 12 | 355 | −15 |
| | Average viscosity change | −20.75 |

Figure 6:
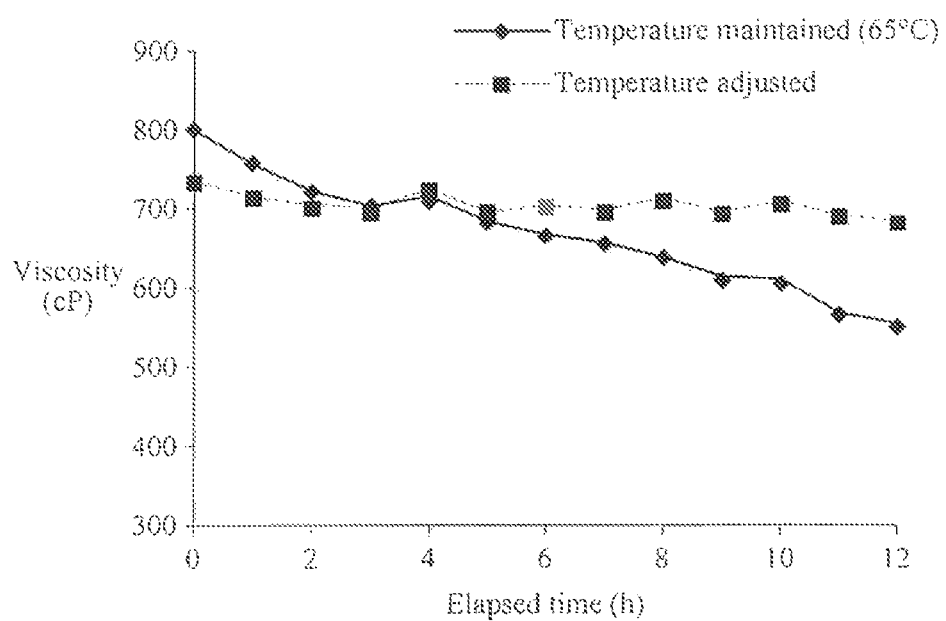
FIG. 6 is a graph illustrating a change in a viscosity of a membrane measured based on time elapsed when a temperature of the membrane is 65° C. and 60° C. according to an example embodiment.

As illustrated in the table above, a viscosity of the membrane 111 of the flavor capsule 101 decreases as time elapses. It is verified that the viscosity decreases by 20.75 cps per hour, on average. A degree of the decrease in the viscosity tends to increase when a temperature increases, which is indicated in the following table and a graph illustrated in FIG. 6.

| Time | Viscosity cps (65° C.) | Viscosity cps (60° C.) |
| --- | --- | --- |
| 1 | 850 | 1080 |
| 2 | 750 | 1200 |
| 3 | 640 | 1190 |
| 4 | 630 | 1055 |
| 5 | 520 | 1010 |
| 6 | 550 | 935 |
| 7 | 530 | 870 |
| 8 | 450 | 825 |
| 9 | 450 | 790 |
| 10 | 450 | 760 |

A total of 400 cps decreases as a result of measuring the viscosity at a temperature of 65° C., whereas a total of 200 cps decreases as a result of measuring the viscosity at a temperature of 60° C. By referring to the table, it is verified that the degree of the decrease in the viscosity is smaller at a lower temperature.

Figure 7:
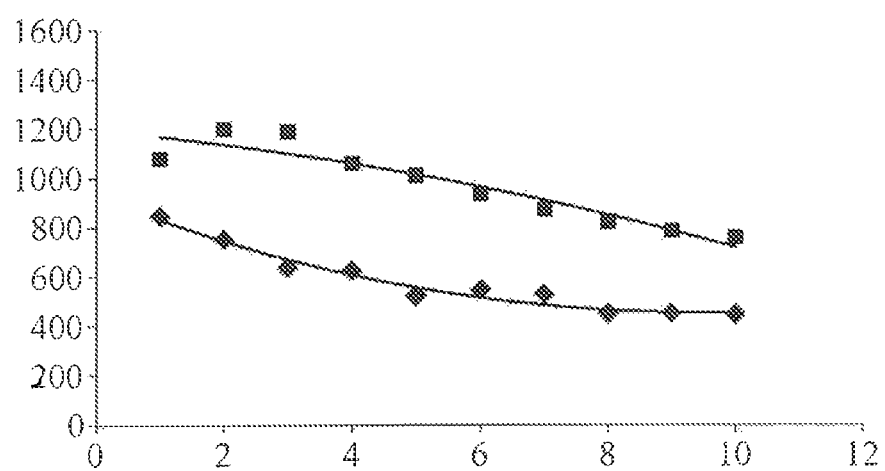
FIG. 7 is a graph illustrating a change in a viscosity of a membrane measured based on time elapsed when a temperature of the membrane is constantly maintained and when the temperature of the membrane is adjusted according to an example embodiment.

The following is a table illustrating a change in a viscosity of the membrane 111 measured when a temperature of a portion of the flavor capsule manufacturing apparatus 100 through which the membrane 111 is to be transferred, for example, the membrane tank 110, the membrane supply line 117, or the nozzle 140, is constantly maintained by the temperature adjuster 150 and the temperature maintainer 155, and when the temperature is adjusted by the temperature adjuster 150 and the temperature maintainer 155, and FIG. 7 is a graph illustrating the change.

| | Constant temperature maintained (65° C.) | Temperature adjusted (membrane tank, membrane supply line, discharge nozzle) | | |
| --- | --- | --- | --- | --- |
| Time elapsed | Viscosity of membrane discharged from nozzle (cP) | Temperature of membrane tank (° C.) | Temperature of supply line and nozzle block (° C.) | Viscosity of membrane discharged from nozzle (cP) |
| 0 | 804 | 65 | 70 | 735 |
| 1 | 760 | 65 | 70 | 717 |
| 2 | 725 | 64 | 68 | 706 |
| 3 | 705 | 64 | 68 | 701 |
| 4 | 715 | 63 | 66 | 725 |
| 5 | 685 | 63 | 66 | 696 |
| 6 | 670 | 62 | 64 | 703 |
| 7 | 658 | 62 | 64 | 699 |
| 8 | 640 | 61 | 62 | 713 |
| 9 | 615 | 61 | 62 | 695 |
| 10 | 610 | 60 | 60 | 709 |
| 11 | 570 | 60 | 60 | 693 |
| 12 | 555 | 60 | 60 | 685 |

As illustrated in the table above and FIG. 7, in a case in which a temperature of an area through which the membrane 111 of the flavor capsule manufacturing apparatus 100 is transferred, for example, the membrane tank 110, the membrane supply line 117, or the nozzle 140, is maintained constantly at 65° C. by the temperature adjuster 150 and the temperature maintainer 155, it is verified that, as a result of measuring a viscosity of the membrane 111 to be discharged, the viscosity of the membrane 111 decreases continuously as time elapses. As the viscosity decreases continuously, an amount of the membrane 111 to be discharged may decrease accordingly, and thus a size of the flavor capsule 101 to be manufactured may also decrease. Therefore, manufacturing the flavor capsule 101 of a size in a standard range may not be easy, and thus an operator may need to adjust a pumping flow rate to adjust an amount to be discharged.

In a case in which a temperature of the area through which the membrane 111 of the flavor capsule manufacturing apparatus 100 is transferred is adjusted, a viscosity of the membrane 111 to be discharged through the nozzle 140 is adjusted as illustrated in the table above and FIG. 7. That is, it is possible to correct a viscosity of the membrane 111. Referring to the table above, it is verified, as a result of repetitively performed experiments, that adjusting a temperature of the membrane tank 110 from 65° C. to 60° C., and adjusting a temperature of the membrane supply line 117 and the nozzle 140 from 70° C. to 60° C. may be desirable to correct a viscosity of the membrane 111. In such a case, a viscosity of the membrane 111 to be discharged may be maintained to be optimal for manufacturing the flavor capsule 101. For example, by increasing an initial temperature of the membrane tank 110 to be greater than 65° C., a viscosity drop rate of the membrane 111 may increase. Conversely, by decreasing the initial temperature to be less than 65° C., a viscosity of the membrane 111 to be discharged may increase and the flavor capsule 101 may be manufactured more slowly.

When manufacturing the flavor capsule 101, the membrane 111 may be discharged through the gear pump 118, and thus a discharge amount of the membrane 111 may be affected by a viscosity of the membrane 111. Thus, for a constant discharge amount of the membrane 111, maintaining a constant viscosity may be needed, and it may be desirable to correct the viscosity by lowering a temperature as time elapses to maintain the constant viscosity. According to an example embodiment, a viscosity of the membrane 111 may be appropriately corrected while a desirable temperature is being maintained by the temperature adjuster 150 or the temperature maintainer 155.

When a temperature of the membrane 111 is adjusted in the membrane temperature adjusting step S200, the viscosity of the membrane 111 may be maintained in an optimal range, and thus reliability of manufacturing the flavor capsule 101 may be improved.

The capsule manufacturing step S300 is performed to manufacture the flavor capsule 101 by wrapping the flavored liquid 121 with the membrane 111 by the nozzle 140. When, by the nozzle 140, the flavored liquid 121 supplied by the flavored liquid tank 120 is wrapped with the membrane 111 supplied by the membrane tank 110, an initial form of the flavor capsule 101 is discharged from the nozzle 140.

As described above, the discharged flavor capsule 101 is transferred through the flavor capsule transfer line 190 to be stored in the capsule storage 180.

After the initial form of the flavor capsule 101 is manufactured, a hardening step of hardening the manufactured flavor capsule 101, a drying step of drying the flavor capsule 101, and a cleaning step of cleaning the flavor capsule 101 are performed. The flavor capsule 101 manufactured through all the processes is sorted by size and packed, and then an entire process of manufacturing the flavor capsule 101 is completed.

As described above, a temperature of the membrane 111 is maintained by the temperature adjuster 150 in the membrane tank 110 and the temperature maintainer 155 in the membrane supply line 117, and a viscosity of the membrane 111 is maintained, and thus the membrane 111 may have a desirable viscosity when the membrane 111 wraps the flavored liquid 121 at the nozzle 140 and the flavor capsule 101 that is firm and strong may be manufactured.

In addition, the membrane 111 and the flavor capsule 101 may be manufactured through a series of processes, and thus efficiency in a process of manufacturing the flavor capsule 101 may be improved. Further, the flavor capsule 101 may be manufactured with the membrane 111 being appropriately bound to the flavored liquid 121, and thus the flavor capsule 101 may be prevented from being randomly torn or crushed, thereby achieving stability. Also, the flavor capsule 101 may well be torn or crushed by an external force applied by a user, and thus provide the user with reliability.

Referring back to FIG. 1, the flavor capsule 30 may need to be well torn or crushed based on an intensity of a force applied, and may not need to be randomly torn or crushed when an external force is not applied. The flavor capsule 30 includes a flavored liquid and a membrane that wraps the flavored liquid. To prevent such an issue described in the foregoing, the flavor capsule 30 may need to have an optimal crush strength. Here, a composition and a thickness of the membrane, and a degree of hardening the flavor capsule 30 may be important to provide such an optimal crush strength. Hereinafter, a flavor capsule manufacturing apparatus and a flavor capsule manufacturing method will be described in greater detail with reference to the accompanying drawings.

Figure 8:
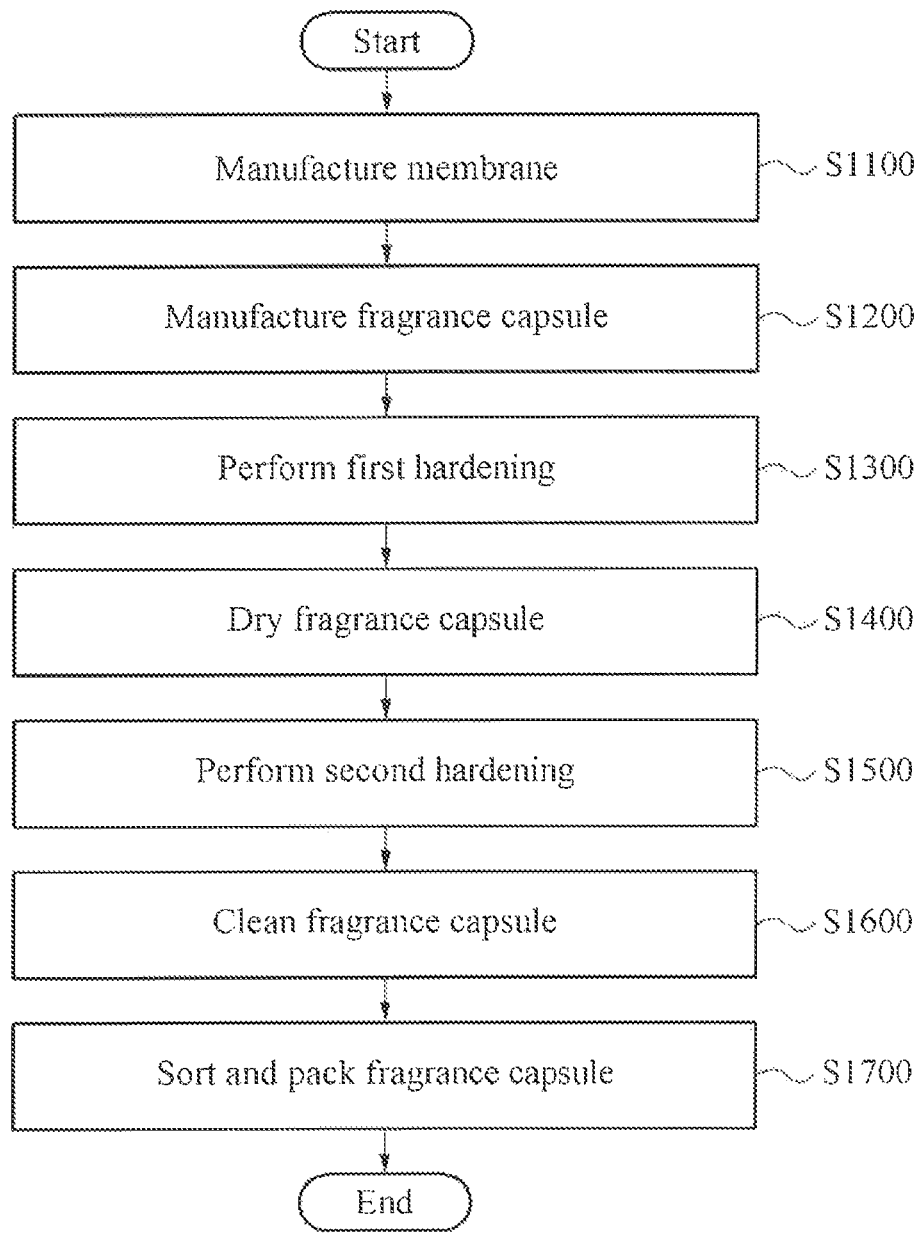
FIG. 8 is a flowchart illustrating another example of a method of manufacturing a flavor capsule of a cigarette according to another example embodiment.
Figure 9:
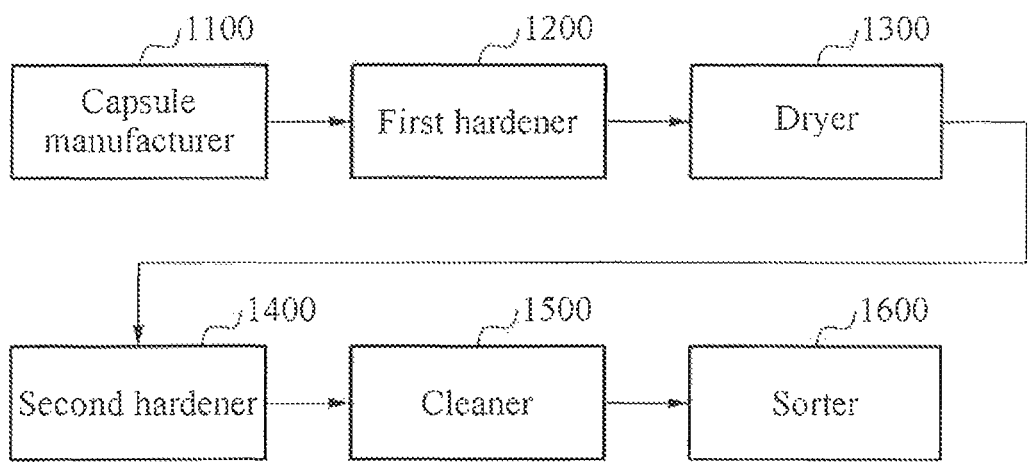
FIG. 9 is a diagram illustrating another example of an apparatus for manufacturing a flavor capsule of a cigarette according to another example embodiment with reference to FIG. 8.

FIG. 8 is a flowchart illustrating another example of a flavor capsule manufacturing method according to another example embodiment. FIG. 9 is a diagram illustrating another example of a flavor capsule manufacturing apparatus according to another example embodiment, with reference to FIG. 8.

A configuration of the flavor capsule manufacturing apparatus according to another example embodiment may be substantially the same as the configuration of the flavor capsule manufacturing apparatus described above, and thus reference may be made to the description provided with reference to FIG. 2.

Referring to FIGS. 8 and 9, and also FIGS. 1 and 2, the flavor capsule manufacturing method used to manufacture a flavor capsule of a cigarette 1 according to another example embodiment includes a membrane manufacturing step S1100 of manufacturing a membrane 111 by a membrane manufacturer (not shown), a capsule manufacturing step S1200 of manufacturing a flavor capsule 101 with the membrane 111 and a flavored liquid 121 to be contained in the membrane 111 by a capsule manufacturer 1100, a first hardening step S1300 of first hardening the flavor capsule 101 by a first hardener 1200, a drying step S1400 of drying the hardened flavor capsule 101 by a dryer 1300, a second hardening step S1500 of additionally hardening the dried flavor capsule 101 by a second hardener 1400, a cleaning step S1600 of cleaning the flavor capsule 101 by a cleaner 1500, and a sorting and packing step S1700 of sorting the flavor capsule 101 by a sorter 1600 and then packing the sorted flavor capsule 101.

As described above, substances included in the membrane 111 include agar, pectin, sodium alginate, and glycerin as a plasticizer, which are dissolved in water to form the membrane 111.

The agar may play a role in hardening based on a temperature such that an initial form or shape of the flavor capsule 101 is formed at an initial stage of forming. The pectin may function as an intermediate modifier between the agar and the sodium alginate and act on a degree of the hardening of the agar and on a calcium ion bonding of the sodium alginate such that the initial form of the flavor capsule 101 is formed, and contribute to improving stability and moisture absorption or hygroscopicity and to forming the membrane 111.

The sodium alginate may be hardened by a calcium ion, and adjust strength of the flavor capsule 101 and form the membrane 111, and also improve hygroscopic stability by such an ionic hardening.

The glycerin may function as a plasticizer, improve formability of the flavor capsule 101, and provide elasticity to the flavor capsule 101. As an amount of the glycerin increases, the hygroscopic stability may deteriorate in a long term because the glycerin itself is highly hygroscopic, although the elasticity of the flavor capsule 101 increases. Conversely, as an amount of the glycerin decreases, the elasticity of the flavor capsule 101 may decrease, and thus the flavor capsule 101 may be readily broken by an external factor. Therefore, an appropriate amount of the glycerin may need to be mixed.

The membrane 111 may be formed with the agar, the pectin, and the sodium alginate, which constitute 45% to 55%, 35% to 45%, and 5% to 15%, respectively, of the membrane 111, excluding water and plasticizer. Through such a composition, a hardness of the membrane 111 may be maintained. However, the composition of the membrane 111 and a ratio thereof are not limited to the preceding, and another composition and a ratio thereof may be applicable to obtain a more desirable hardness of the membrane 111.

Here, a viscosity of the membrane 111 may need to be measured to verify whether the viscosity of the membrane 111 is in a set range in order to prevent a quality issue of a finished product, which may be caused when the viscosity of the membrane 111 is out of the range. As described, an optimal viscosity of the membrane 111 is 400 to 700 cps, and more desirably, 500 to 650 cps. To maintain such an optimal viscosity of the membrane 111, maintaining a temperature of a membrane tank 110 in which the membrane 111 is to be stored or a membrane supply line 117 through which the membrane 111 is to be supplied may also be important, and thus a temperature maintainer (not shown) may be provided in the membrane tank 110 or the membrane supply line 117.

In addition to a viscosity of the membrane 111, an appropriate gelation temperature of the membrane 111 may also need to be maintained. The following is a table illustrating a relationship between an initial viscosity and a gelation temperature of the membrane 111.

in the nozzle 140. Thus, a gelation temperature maintainer may also be included additionally to maintain such an appropriate gelation temperature of the membrane 111.

As described above, the capsule manufacturing step S1200 is performed to manufacture the flavor capsule 101 by wrapping the flavored liquid 121 with the membrane 111 by the flavor capsule manufacturing apparatus 100.

In the flavor capsule 101 manufactured by the flavor capsule manufacturing apparatus 100, a thickness of the membrane 111 wrapping the flavored liquid 121 is 0.5 to 0.8

| | Main substance content (%) | | Additional substance content (%) | | | | | Additive content (%) | | Content (%) |
|---|---|---|---|---|---|---|---|---|---|---|
| Sample No. | Agar | Kappu carrageenan | Iota carrageenan | Pectin | LBG | Xanthan gum | Dextrin | Alginic acid | KCL | Glycerin | Total |
| 1 | 2.5 | | | 2.5 | | | | 0.2 | | 5 | 10.2 |
| 2 | 2.5 | | 2.5 | | | | | 0.2 | | 5 | 10.2 |
| 3 | 2.5 | | | 2 | 0.25 | 0.25 | | 0.2 | | 5 | 10.2 |
| 4 | 2.5 | | | | | | 2.5 | 0.2 | | 5 | 10.2 |
| 5 | 5 | | | | | | | 0.2 | | 5 | 10.2 |
| 6 | | 2.5 | | 2 | | | | 0.2 | | 5 | 9.7 |
| 7 | | 2.5 | | | | | 2.5 | 0.2 | | 5 | 10.2 |
| 8 | | 2.5 | | | | | 2.5 | 0.2 | 0.3 | 5 | 10.5 |
| 9 | | 2.75 | | | | | 2.25 | 0.2 | | 5 | 10.2 |

| Sample No. | Initial viscosity (cps) | Gelation temperature (°C.) | Gel strength (gf) 2 hours 20° C. | Crush strength distance (mm) 2 hours 20° C. | Syneresis rate (%) | Remarks |
|---|---|---|---|---|---|---|
| 1 | 520 | 48 | 1195 | 3.2 | 0.72 | Optimal manufacturing condition |
| 2 | 1700 | 51 | 562 | 3.19 | 0.41 | High viscosity, not possible to manufacture capsule |
| 3 | 1750 | 52 | 1562 | 4.73 | 0.69 | High viscosity, not possible to manufacture capsule |
| 4 | 225 | 49 | 1284 | 3.84 | 1.41 | Viscosity ↓. Appropriateness of manufacturing capsule ↓ |
| 5 | 850 | 50 | 3037 | 3.26 | 1.9 | Viscosity ↑. Appropriateness of manufacturing capsule ↓ |
| 6 | 850 | 51 | 1558 | 4.53 | 1.15 | Viscosity ↑. Appropriateness of manufacturing capsule ↓ |
| 7 | 325 | 50 | 1558 | 6.83 | 2.3 | Viscosity ↓. Appropriateness of manufacturing capsule ↓ |
| 8 | 300 | 49 | 2153 | 5.91 | 3.15 | Viscosity ↓. Appropriateness of manufacturing capsule ↓ |
| 9 | 412.5 | 52 | 1841 | 7.24 | 1.89 | Gelation temperature ↑. Appropriateness of manufacturing capsule ↓ |

Referring to the table above, when forming the membrane 111 through such a combination of the main and additional substances and the additives, a most appropriate initial viscosity is 520 cps, and a most appropriate gelation temperature is 48° C. In a case in which the initial viscosity is out of an optimal viscosity range of 400 to 700 cps, or more desirably, 500 to 650 cps, manufacturing the flavor capsule 101 may not be possible or not appropriate. In addition, the gelation temperature may need to be desirably 48° C., not exceeding 50° C.

As described above, in addition to a viscosity, an appropriate gelation temperature of the membrane 111 may need to be maintained because a gelation temperature greater than a titrated temperature range may lower a speed of hardening the membrane 111, and a gelation temperature less than the titrated temperature range may cause the membrane 111 to be harden before it is discharged from a nozzle 140 or caught mm, through which an optimal crush strength of the flavor capsule 101 may be achieved.

In detail, in response to a thickness of the membrane 111 being greater than 0.8 mm, a probability of the flavor capsule 101 being broken during the drying step S1400 may be reduced. However, due to a high crush strength of the flavor capsule 101 in a finished product, a user may not easily break or crush it by applying an external force to a cigarette. Conversely, in response to a thickness of the membrane 111 being less than 0.5 mm, an appropriate crush strength may not be obtained, and also a probability of the flavor capsule 101 being broken during the drying step S1400 hereinafter may increase, and thus a finished product of the flavor capsule 101 with a high yield may not be obtained. The following is a table illustrating a crush strength based on a membrane thickness.

EXAMPLE

| Classification | Outer diameter of capsule (mm) | Inner diameter of capsule (mm) | Thickness of membrane | Average crush strength (kgf) | Remarks |
|---|---|---|---|---|---|
| #1 | 5.4 | 3.5 | 0.95 | 3.0 | Not able to crush by hand |
| #2 | 4.9 | 3.5 | 0.70 | 1.4 | |
| #3 | 4.4 | 3.5 | 0.45 | — | Not possible to dry capsule |

Figure 10:
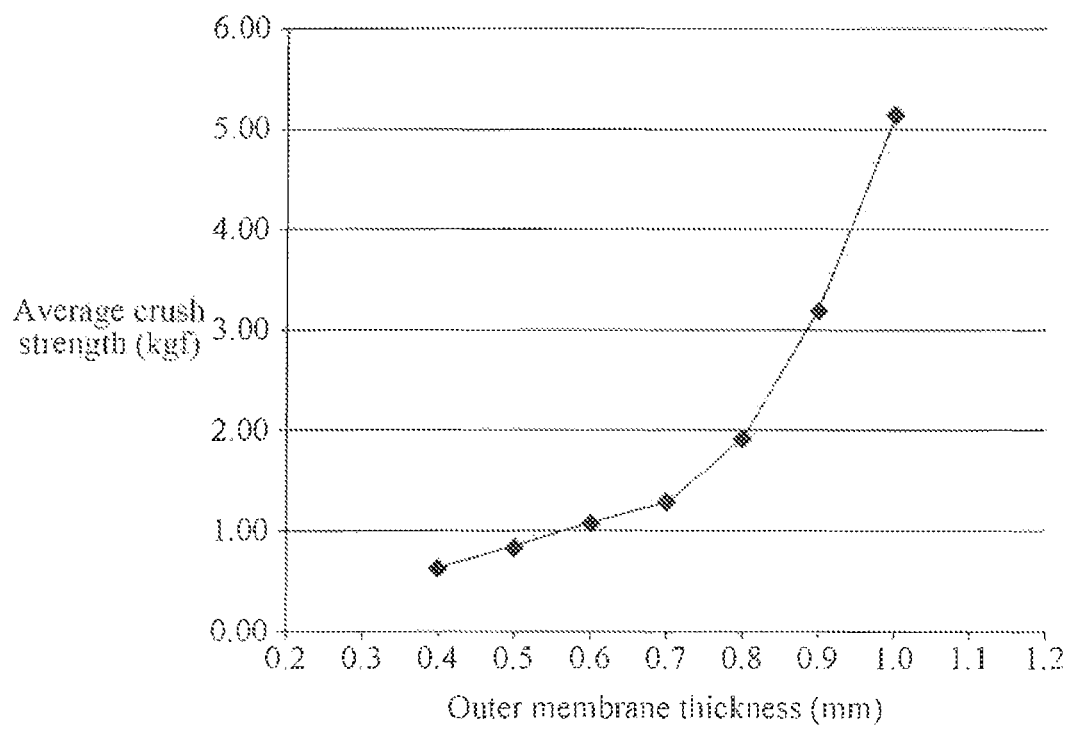
FIG. 10 is a diagram illustrating a change in an average crush strength based on a thickness of a membrane according to an example embodiment.

The following is a table illustrating a crush strength based on a thickness of the membrane 111 when manufacturing the flavor capsule 101, and FIG. 10 is a graph illustrating the crush strength. A result of performing an experiment using the flavor capsule 101 with a diameter of 3.4 mm is as follows.

| Outer membrane thickness (mm) | Average crush strength (kgf) |
|---|---|
| 0.4 | 0.65 |
| 0.5 | 0.84 |
| 0.6 | 1.08 |
| 0.7 | 1.32 |
| 0.8 | 1.96 |
| 0.9 | 3.21 |
| 1.0 | 5.17 |

In detail, as a result of a tobacco manufacturing appropriateness evaluation and a consumer sensory evaluation, an optimal crush strength of the flavor capsule 101 is in a range of 0.8 to 2.0 kilogram-force (kgf). In a case of the flavor capsule 101 with a crush strength less than 0.8 kgf, the flavor capsule 101 may not be broken easily or lightly, and just be pressed, when a user applies an external force to break the flavor capsule 101 due to a weak strength, and thus a quality felt by the user may deteriorate. In addition, the flavor capsule 101 with such a weak strength may be frequently broken in a process of manufacturing a cigarette, and thus it may not be possible to apply such a flavor capsule 101 to manufacture the cigarette. In contrast, in a case of the flavor capsule 101 with a crush strength greater than 2.0 kgf, a user may not easily break the flavor capsule 101 by applying an external force due to such a high strength, although the flavor capsule 101 does not have any problem in appropriateness of manufacturing a cigarette.

The cases described in the foregoing may be explained with reference to the following table. In the table below, breaking characteristics indicate, by 0 to 9, how lightly and refreshingly the flavor capsule 101 is broken when breaking the flavor capsule 101. In the breaking characteristics, 0 to 3 indicate dissatisfaction, 3 to 6 indicate satisfaction, and 6 to 9 indicate extreme satisfaction.

| Average crush strength (kgf) | Breaking characteristics |
|---|---|
| 0.6 | 2.4 |
| 0.8 | 5.9 |
| 1.0 | 6.1 |
| 1.4 | 7.2 |
| 1.6 | 6.5 |
| 2.0 | 3.8 |
| 2.5 | 1.1 |
| 3.0 | 0.8 |

As illustrated in the table above, in response to the average crush strength being in a range of 0.8 to 2.0 kgf, the breaking characteristics correspond to satisfaction or extreme satisfaction. Conversely, in response to the average crush strength being out of the range, the breaking characteristics correspond to dissatisfaction.

The following is a table illustrating a relationship between a crush strength and appropriateness of manufacturing the flavor capsule 101. In the table below, the number of capsules broken indicates the number of flavor capsules that are broken after a cigarette filter is injected when the cigarette filter is manufactured using 1 kilogram (kg) of flavor capsules, or approximately 45,000 flavor capsules.

| Average crush strength (kgf) | Number of capsules broken |
|---|---|
| 0.6 | 67 |
| 0.8 | 8 |
| 1.0 | 4 |
| 1.4 | 1 |
| 1.8 | 0 |
| 2.0 | 0 |

Referring to the table above, it is verified that a large number of flavor capsules is broken in response to a crush strength being less than 0.8 kgf, and the number of the flavor capsules broken is stably maintained in response to the crush strength being in a range of 0.8 to 2.0 kgf.

According to an example embodiment, a thickness of the membrane 111 wrapping the flavored liquid 121 is 0.5 to 0.8 mm, and thus the flavor capsule 101 having a crush strength of 0.8 to 2.0 kgf as illustrated in the table above and FIG. 10 may be obtained. In addition, the breaking characteristics of the flavor capsule 101 may thus correspond to an extremely satisfactory state, and the number of faulty flavor capsules that may be manufactured when the flavor capsules are broken while the cigarette filter is being manufactured may be minimized.

Through such a configuration described in the foregoing, the capsule manufacturing step S1200 may be performed by the flavor capsule manufacturing apparatus 100, and an initial form of the flavor capsule 101 may be manufactured.

The first hardening step S1300 is performed to first harden the flavor capsule 101 that is manufactured in the capsule manufacturing step S1200. In this step, the flavor capsule 101 is hardended using a prepared ethanol (EtOH) solution. The prepared EtOH solution is a 70% to 100% EtOH solution, and the first hardening is performed by immersing the flavor capsule 101 in the EtOH solution for 3 to 5, or more desirably, 4 minutes. Through such a hardening step, a crush strength of the flavor capsule 101 may be enhanced.

The drying step S1400 is performed by using the dryer 1300 to dry the hardened flavor capsule 101. In this step, the flavor capsule 101 is dried at a set temperature, humidity, air volume, or rotation speed. After the drying is completed, the flavor capsule 101 is separated by each batch and stored in a drying plate to be balanced.

The second hardening step S1500 is performed by using the second hardener 1400 to additionally harden the flavor capsule 101 to prevent moisture absorption of the dried flavor capsule 101. In this step, an EtOH solution used as a hardening agent is prepared by mixing distilled water and EtOH at a set ratio, for example, 4:6 to 7:3 (same ratio). The distilled water may include 0.1% to 5.0% calcium chloride. Through the second hardening step S1500, an optimal crush strength may be obtained.

The cleaning step S1600 is performed by using the cleaner 1500 to clean the flavor capsule 101 that is additionally hardened. In this step, a 95% EtOH solution may be used as a cleaning solution. However, a concentration of EtOH in the EtOH solution is not limited to the preceding.

The sorting and packing step S1700 is performed by using the sorter 1600 to first sort the flavor capsule 101 that meets a standard and sort out a faulty flavor capsule with a naked eye, and then pack the sorted flavor capsule 101.

As described above, an optimal crush strength of the flavor capsule 101 may be obtained by manufacturing the membrane 111 based on a ratio, or a proportion, and a composition that are set during a series of processes of manufacturing the flavor capsule 101, and adjusting a thickness of the membrane 111, and also performing hardening twice.

Further, the membrane 111 and the flavor capsule 101 may be manufactured through a series of processes, and thus efficiency in the process of manufacturing the flavor capsule 101 may be improved. In addition, the flavor capsule 101 may be manufactured with the membrane 111 being appropriately bound to the flavored liquid 121, and thus the flavor capsule 101 may be prevented from being randomly torn or crushed to achieve stability. In addition, the flavor capsule 101 may well be torn or crushed by an external force applied by a user, thereby providing the user with reliability in usage.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. An apparatus for manufacturing a flavor capsule of a cigarette, the apparatus comprising:
   a membrane tank configured to store a membrane;
   a flavored liquid tank configured to store a flavored liquid; and
   a nozzle configured to receive the membrane from the membrane tank and the flavored liquid from the flavored liquid tank, and simultaneously discharge the membrane and the flavored liquid such that the membrane wraps the flavored liquid to form an initial form of the flavor capsule,
   wherein the membrane tank includes a temperature adjuster configured to decrease a temperature of the membrane tank to a preset temperature based on time to maintain a viscosity of the membrane,
   wherein the membrane tank and the nozzle are connected through a membrane supply line, wherein the membrane supply line includes a temperature maintainer configured to maintain a temperature of the supply line to be the temperature of the membrane tank, and
   wherein the temperature maintainer is configured to decrease the temperature of the membrane supply line to the corresponding degree in response to the decrease of the temperature per hour by the temperature adjuster so that the temperature of the membrane supply line is not less than the preset temperature.

2. The apparatus of claim 1, wherein the viscosity of the membrane is corrected by controlling a temperature of the membrane through the temperature adjuster or the temperature maintainer.

3. The apparatus of claim 1, wherein temperature control by the temperature adjuster based on an initial viscosity of the membrane in the membrane tank is programmed and automatically performed.

4. The apparatus of claim 2, wherein the viscosity of the membrane to be maintained by the temperature adjuster is 400 to 700 centipoise (cps).

* * * * *